United States Patent
Pimpalgaonkar et al.

(10) Patent No.: US 8,747,760 B2
(45) Date of Patent: Jun. 10, 2014

(54) CATALYTIC CONVERTER

(75) Inventors: Hrushikesh G. Pimpalgaonkar, Karnataka (IN); Atul Pant, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 281 days.

(21) Appl. No.: 13/293,438

(22) Filed: Nov. 10, 2011

(65) Prior Publication Data

US 2013/0121887 A1   May 16, 2013

(51) Int. Cl.
    *B01D 50/00*   (2006.01)
(52) U.S. Cl.
    USPC .......................................... 422/176; 422/177
(58) Field of Classification Search
    CPC ..... F01N 3/2892; F01N 3/28; F01N 2330/30; F01N 2330/48; F01N 2330/06; B01D 53/9445; B01D 53/944
    USPC .......................................... 422/177, 180, 176
    See application file for complete search history.

(56) References Cited

U.S. PATENT DOCUMENTS

| | | | | |
|---|---|---|---|---|
| 3,853,485 A * | 12/1974 | Hogan | .......................... | 502/300 |
| 3,989,471 A * | 11/1976 | Nowak | .......................... | 422/179 |
| 6,938,339 B2 * | 9/2005 | Hughes | ........................... | 29/890 |
| 7,238,217 B2 * | 7/2007 | Cutler et al. | .................... | 55/523 |
| 7,384,441 B2 * | 6/2008 | Ito et al. | .......................... | 55/523 |

FOREIGN PATENT DOCUMENTS

EP   1598111 A1 * 11/2005

* cited by examiner

*Primary Examiner* — Tom Duong
(74) *Attorney, Agent, or Firm* — Quinn Law Group, PLLC

(57) ABSTRACT

A catalytic converter includes a housing defining an interior space, with a monolith supported therein. The monolith includes a catalyst disposed thereon. The catalytic converter includes a flow directing mechanism defined by one of the housing and/or the monolith to re-direct a flow of exhaust gas across the monolith to obtain a more even flow distribution of exhaust gas across the monolith. The monolith may include different regions, with each region including a different catalyst density disposed thereon. The catalyst density of each region may be optimized for the flow rate of exhaust gas across the monolith through each region.

14 Claims, 2 Drawing Sheets

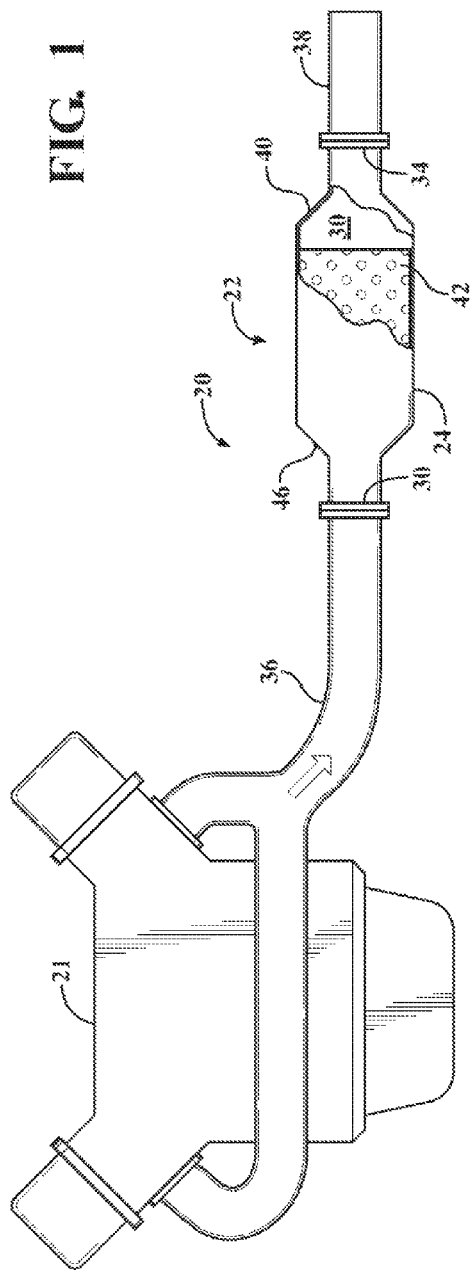
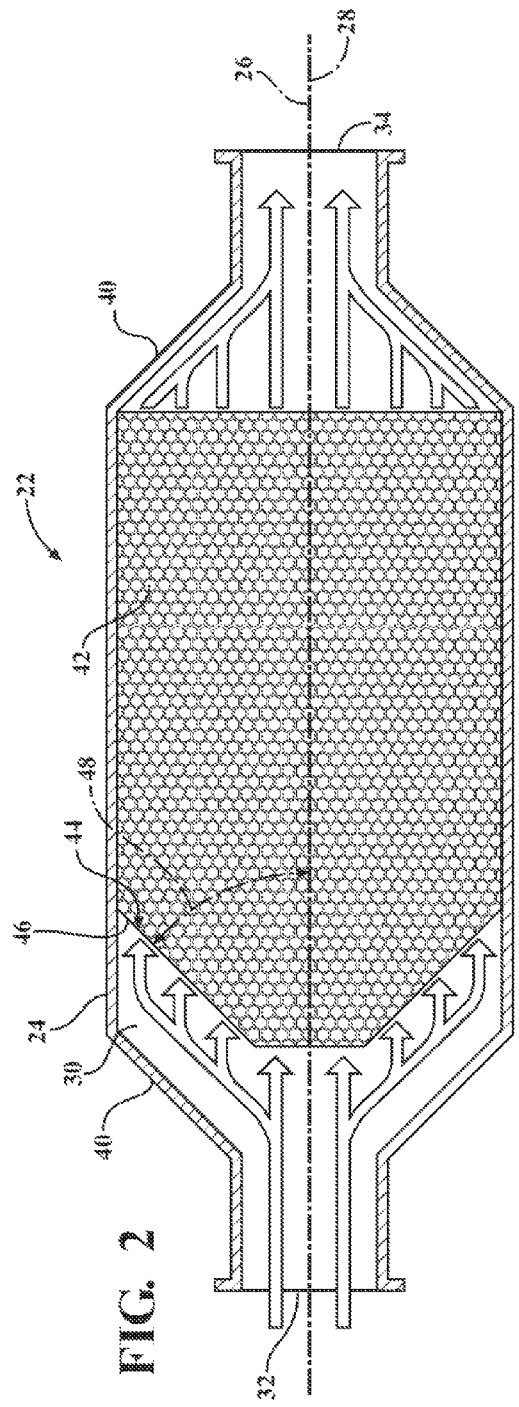

CATALYTIC CONVERTER

TECHNICAL FIELD

The invention generally relates to an exhaust gas treatment system for treating a flow of exhaust gas from an internal combustion engine of a vehicle, and more specifically to a catalytic converter assembly for the exhaust gas treatment system.

BACKGROUND

Exhaust gas treatment systems for internal combustion engines, including but not limited to gasoline engines or diesel engines, may include a catalytic converter for treating a flow of exhaust gas from the internal combustion engine. The catalytic converter is a flow through device that consists of a housing containing a monolith, such as but not limited to a honeycomb-like structure. The monolith includes a large surface area that is coated with an active catalyst layer. The active catalyst layer may include, but is not limited to, a Platinum Group Metal (PGM). As the exhaust gases traverse the active catalyst layer, carbon monoxide, gaseous hydrocarbons and liquid hydrocarbon particles, i.e., unburned fuel and/or oil, are oxidized, thereby reducing harmful emissions.

The housing of the catalytic converter includes an inlet and an outlet, and typically includes a tubular shape defining an interior space that is larger than a flow area of the exhaust pipes connected to the inlet and the outlet respectively. Accordingly, the housing of the catalytic converter includes a conical section adjacent each of the inlet and the outlet to transition from the smaller diameter of the exhaust pipes to the larger diameter of the interior space of the housing. The more evenly the flow of exhaust gas is distributed across the monolith, the more efficient the catalytic converter operates.

SUMMARY

A catalytic converter assembly for an exhaust gas treatment system of a vehicle is provided. The catalytic converter assembly includes a housing. The housing defines an interior space, and includes an inlet and an outlet spaced from each other along a longitudinal axis. The inlet and the outlet are disposed in fluid communication with the interior space. A monolith is supported by the housing within the interior space of the housing. The monolith includes a catalyst disposed thereon. At least one of the housing and the monolith include a flow directing mechanism. The flow directing mechanism is configured for re-directing at least a portion of the exhaust gas received through the inlet toward a pre-defined region of the monolith to more evenly distribute the exhaust gas across a cross sectional area of the monolith.

An exhaust gas treatment system for treating exhaust gas of an internal combustion engine of a vehicle is also provided. The exhaust gas treatment system includes a catalytic converter. The catalytic converter includes a housing that defines an interior space, and includes an inlet and an outlet spaced from each other along a longitudinal axis. The inlet and the outlet are disposed in fluid communication with the interior space. The inlet and the outlet are radially offset relative to a radial center of the housing. A monolith is supported by the housing within the interior space of the housing. The monolith includes a catalyst disposed thereon. The monolith includes a plurality of regions radially spaced about the radial center of the housing and extending along the longitudinal axis. Each region of the monolith includes a different cell density.

Accordingly, the flow directing mechanism of the catalytic converter directs at least a portion of the flow of exhaust gas to a pre-determined region to evenly distribute the exhaust gas across a cross sectional area of the monolith, thereby improving the efficiency of the catalytic converter. Additionally, the different regions of the monolith, each having a different cell density, provide a different surface area for catalyst disposition thereon, thereby accommodating different exhaust flow rates. The cell density is configured to provide the appropriate surface area for the catalyst for the flow rate associated with each specific region. Depending upon the exhaust flow rate each region receives, each region may include a different catalyst density disposed thereon. Furthermore, depending upon the temperature distribution caused by the different cell density regions, each cell density region may include a different catalyst disposed thereon. The catalyst density may vary radially between the different regions, and may further vary longitudinally along the longitudinal axis, thereby optimizing the quantity of catalyst used to reduce the overall quantity of catalyst disposed on the monolith.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of an exhaust gas treatment system having a catalytic converter for an internal combustion engine.

FIG. 2 is a schematic cross sectional view of the catalytic converter along a longitudinal axis thereof showing a first embodiment of a flow directing mechanism.

DETAILED DESCRIPTION

Figure 3:
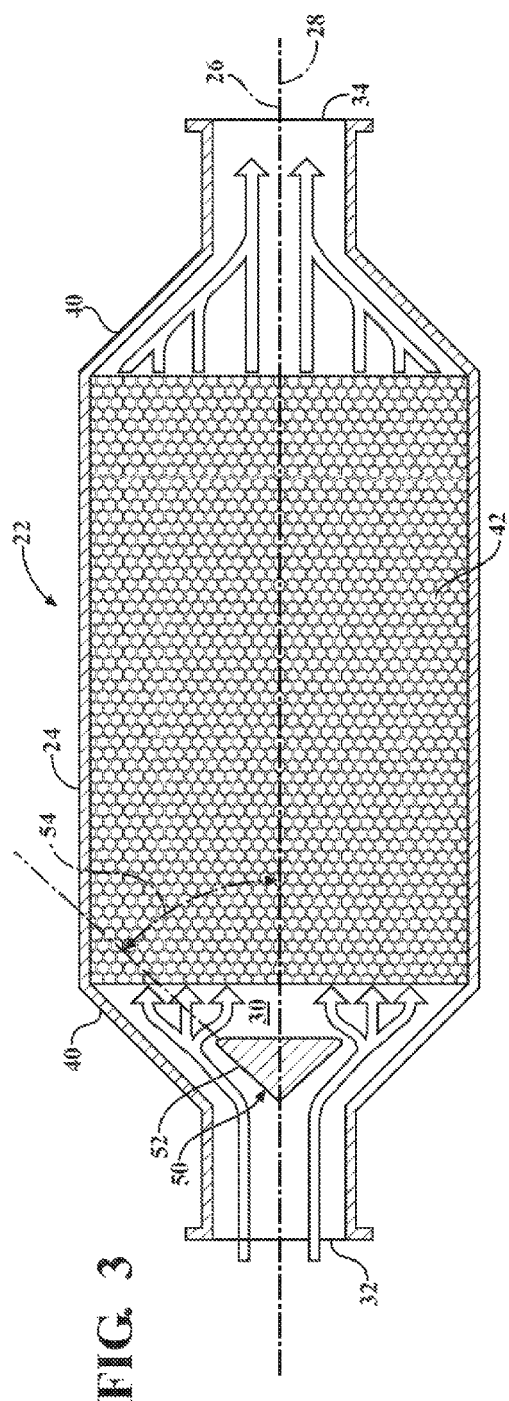
FIG. 3 is a schematic cross sectional view of the catalytic converter along the longitudinal axis thereof showing a second embodiment of a flow directing mechanism.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an exhaust gas treatment system is generally shown at 20. The exhaust gas treatment system 20 treats exhaust gas from an internal combustion engine 21 of a vehicle.

The exhaust gas treatment system 20 includes a catalytic converter 22. The catalytic converter 22 includes a housing 24. The housing 24 extends along a longitudinal axis 26, and may define a substantially tubular shape having a circular or oval cross section perpendicular to the longitudinal axis 26. As shown, the longitudinal axis 26 is co-axially aligned with a radial center 28 of the housing 24. While the housing 24 is shown having a circular cross section, it should be appreciated that the housing 24 may define some other shape, including but not limited to oval, rectangular, or polygonal.

The housing 24 forms a shell or casing that defines an interior space 30. Additionally, the housing 24 includes an inlet 32 and an outlet 34. The inlet 32 and the outlet 34 are spaced from each other along the longitudinal axis 26. As shown in FIGS. 2 and 3, the inlet 32 and the outlet 34 are co-axially aligned with each other and radially offset relative to the radial center 28 and the longitudinal axis 26 of the housing 24. However, it should be appreciated that the positions of the inlet 32 and the outlet 34 relative to the each other and the housing 24 may differ from that shown and described herein.

The inlet 32 is in fluid communication with the internal combustion engine 21 and the interior space 30, and communicates the flow of exhaust gas from the internal combustion engine 21 to the interior space 30 via an exhaust pipe 36. The outlet 34 is in fluid communication with the interior space 30, and discharges the exhaust gas from the interior space 30 via another exhaust pipe 38. The interior space 30 includes a cross sectional flow area perpendicular relative to the longitudinal axis 26 that is larger than a cross sectional flow area of the inlet 32 and/or the outlet 34. Accordingly, the housing 24 may include a conical section 40 disposed at each axial end thereof to connect the inlet 32 and the outlet 34 to the interior space 30 of the housing 24.

A monolith 42 is disposed within and supported by the housing 24, within the interior space 30 of the housing 24. The monolith 42 includes a catalyst disposed thereon. The monolith 42 may include, for example, honeycomb-like structure allowing the exhaust gas to flow through passages therein. The monolith 42 includes a large surface area that is coated with the catalyst. The catalyst treats the flow of exhaust gas from the internal combustion engine 21 to reduce the toxicity of the exhaust gas, i.e., to reduce toxic emissions of the exhaust gas, including but not limited to, nitrogen oxides (NO), carbon monoxide (CO) and/or hydrocarbons (HC). As the exhaust gases traverse the catalyst disposed on the monolith 42, carbon monoxide, gaseous hydrocarbons and liquid hydrocarbon particles, i.e., unburned fuel and/or oil, are oxidized, thereby reducing harmful emissions. The catalyst material may include but is not limited to Platinum Group Metals (PGM), and convert a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

At least one of the housing 24 and the monolith 42 may include a flow directing mechanism 44, 50. The flow directing mechanism 44, 50 is configured to re-directing at least a portion of the exhaust gas received through the inlet 32 toward a pre-defined region of the monolith 42. The flow directing mechanism 44, 50 re-directs the flow of exhaust gas to more evenly distribute the exhaust gas across a cross sectional area of the monolith 42. Evenly distributing the flow of exhaust gas across the full cross sectional area of the monolith 42 reduces "hot spots" in the monolith 42, thereby improving the useful life of the catalyst. Furthermore, evenly distributing the flow of exhaust gas across the monolith 42 improves the efficiency of the catalyst.

The flow directing mechanism 44, 50 may be disposed on and/or formed by either the housing 24 and/or the monolith 42, and may be configured in any suitable manner capable of directing the flow of exhaust gas from the inlet 32 to specific regions of the monolith 42. As such, the flow directing mechanism 44, 50 may direct the flow of exhaust gas to regions of the monolith 42 that are otherwise underutilized, i.e., with a lower than optimal exhaust flow rate there across.

Referring to FIG. 2, a first embodiment of the flow directing mechanism is shown at 44. The flow directing mechanism 44 includes an angled entrance surface 46 that is disposed on and defined by the monolith 42. The angled entrance surface 46 is angled relative to the longitudinal axis 26 to form an angle 48 therebetween. The angle 48 formed between the angled entrance surface 46 of the monolith 42 and the longitudinal axis 26 may vary. The angled entrance surface 46 defines an outer radius that continually changes relative to the longitudinal axis 26 at any location of the angled entrance surface 46 along the longitudinal axis 26. The rate of change of the outer radius of the angled entrance surface relative to the longitudinal axis 26 may be constant, thereby defining a linear slope such as with a conical shape, or may be variable, thereby defining a curved slope such as with a parabolic shape. The outer radius of the angled entrance surface 46 may equal zero at the longitudinal axis 26, or may increase to a maximum length equal the radial distance between the longitudinal axis 26 and the outer radius of the monolith 42. The angled entrance surface 46 is disposed adjacent the inlet 32 of the housing 24 so that the flow of exhaust gas from the inlet 32 is directed onto the angled entrance surface 46, which thereby re-directs at least a portion of the flow of exhaust gas from its initial flow path through the inlet 32.

Referring to FIG. 3, a second embodiment of the flow directing mechanism is shown at 50. The flow directing mechanism 50 includes a conical insert 52 defined by or attached to the housing 24. Preferably, the conical insert 52 is hollow and manufactured from a material having a low heat capacity to prevent the conical insert 52 from absorbing and storing heat. The conical insert 52 is angled relative to the longitudinal axis 26 to form an angle 54 therebetween. The conical insert 52 is disposed adjacent the inlet 32 of the housing 24 so that the flow of exhaust gas from the inlet 32 is directed thereon, with the conical insert 52 re-directing at least a portion of the flow of exhaust gas from its initial flow path through the inlet 32. The angle 54 formed between the conical insert 52 and the longitudinal axis 26 is preferably between the range of 20° and 70°.

It should be appreciated that the flow directing mechanism 44, 50 may be configured in some other manner than shown in the first embodiment of the flow direction mechanism or the second embodiment of the flow directing mechanism 44, 50. Furthermore, as indicated above, the flow directing mechanism 44, 50 may re-direct only a portion of the flow of exhaust gas, or may be configured to re-direct the entire flow of the exhaust gas.

Figure 4:
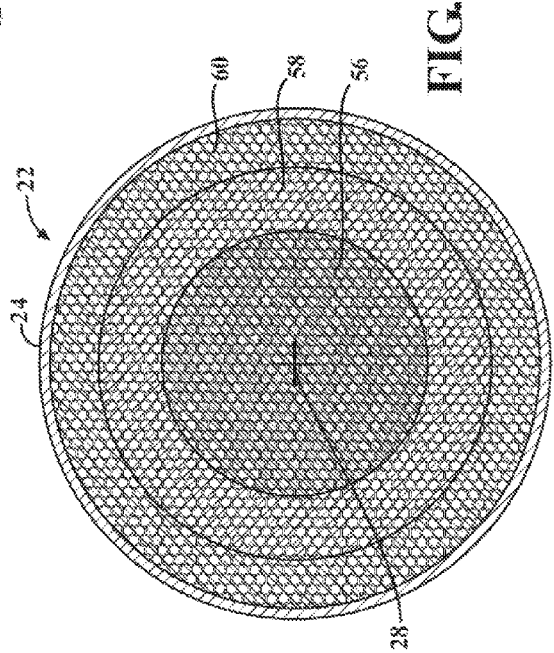
FIG. 4 is a schematic cross sectional view of the catalytic converter perpendicular to the longitudinal axis and showing different regions of a monolith, with each region having a different catalyst density disposed thereon.

Referring to FIG. 4, the monolith 42 may include a plurality of regions. As shown, the monolith 42 includes a central region 56, an intermediate region 58 and an outer region 60. However, the monolith 42 may include any number of regions equal to or greater than two regions. Each region may include a different cell density. The cell density is defined herein as a number of cells defined by the monolith per unit surface area, e.g., square inch, of the monolith 42. As shown, each of the plurality of regions is radially spaced about the radial center 28 of the housing 24 and extends along the longitudinal axis 26 of the housing 24. The cell density for each region may be optimized for the expected flow rate of the exhaust gas across each region. Accordingly, regions of the monolith 42 that receive a higher flow rate of the exhaust gas, such as for example the central region 56 of the monolith 42, may include a higher cell density, whereas regions of the monolith 42 that receive a lower flow rate of the exhaust gas, such as for example the outer region 60 adjacent the housing 24, may include a lower cell density. As such, the cell density between adjacent regions may decrease with an increase in the radial distance of each region from the radial center 28 of the housing 24, with the central region 56 having a higher cell density than the intermediate region 58, and the intermediate region 58 having a higher cell density than the outer region 60. It should be appreciated that the regions and the specific cell density thereon may differ from the exemplary embodiment shown in FIG. 4 and described herein.

The cell density is configured to provide the appropriate surface area for the catalyst for the flow rate associated with each specific region. Depending upon the exhaust flow rate each region receives, each region may include a different catalyst density disposed thereon. The catalyst density may vary radially between the different regions, and may further vary longitudinally along the longitudinal axis 26, thereby optimizing the quantity of catalyst used to reduce the overall quantity of catalyst disposed on the monolith 42. The size and volume of each region may be calculated from the radial thickness of each region relative to the longitudinal axis 26, and the length of each region along the longitudinal axis 26. The size and/or volume of each region may be determined based on the velocity profile of the exhaust within the upstream conical section 40 of the housing 24. The interface between two adjacent cell density regions preferably occurs where a mal-distribution in the exhaust flow affects the velocity profile within the upstream conical section 40, which is the location where the velocity of the exhaust gas in the upstream conical section 40 of the housing 24 starts dropping significantly compared to the velocity of the exhaust gas near the longitudinal axis 26. Furthermore, depending upon the temperature distribution resulting from the different cell densities of each region, each region may include a different catalyst disposed thereon.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A catalytic converter assembly for an exhaust gas treatment system of a vehicle, the catalytic converter assembly comprising:
    a housing defining an interior space and having an inlet and an outlet spaced from each other along a longitudinal axis and in fluid communication with the interior space; and
    a monolith supported by the housing within the interior space of the housing and including a catalyst disposed thereon;
    wherein at least one of the housing and the monolith include a flow directing mechanism configured for re-directing at least a portion of the exhaust gas received through the inlet toward a pre-defined region of the monolith to more evenly distribute the exhaust gas across a cross sectional area of the monolith;
    wherein the monolith includes a plurality of regions, with each region having a different cell density;
    wherein the plurality of regions are radially spaced about a radial center of the housing and extend along the longitudinal axis of the housing; and
    wherein each region includes a different catalyst disposed thereon.

2. A catalytic converter assembly as set forth in claim 1 wherein the flow directing mechanism includes an angled entrance surface defined by the monolith, with the angled entrance surface angled relative to the longitudinal axis and disposed adjacent the inlet of the housing.

3. A catalytic converter assembly as set forth in claim 2 wherein the angled entrance surface of the monolith defines an outer radius relative to the longitudinal axis that continually changes along the longitudinal axis.

4. A catalytic converter assembly as set forth in claim 3 wherein the outer radius of the angled entrance surface may define a linear surface or a parabolic surface, and wherein the outer radius of the angled entrance surface may vary between the range of zero and an outer diameter of the monolith.

5. A catalytic converter assembly as set forth in claim 1 wherein the flow directing mechanism includes a conical insert disposed within the housing, with the conical insert including a surface angled relative to the longitudinal axis and disposed adjacent the inlet of the housing, wherein the conical insert is longitudinally spaced from the monolith along the longitudinal axis to define a space therebetween.

6. A catalytic converter assembly as set forth in claim 5 wherein the surface of the conical insert forms an angle relative to the longitudinal axis between the range of 20° and 70°.

7. A catalytic converter assembly as set forth in claim 1 wherein the cell density between adjacent regions decreases with an increase in the radial distance of each region from the radial center of the housing.

8. A catalytic converter assembly as set forth in claim 1 wherein an interface between each adjacent pair of regions is located at a point where separation in the exhaust flow affects a velocity profile of the exhaust within an upstream conical section of the housing.

9. A catalytic converter assembly as set forth in claim 1 wherein the catalyst is disposed on the monolith at a pre-defined catalyst density, with the catalyst density variable in at least one of a longitudinal direction along the longitudinal axis or a radial direction radially outward from the longitudinal axis.

10. An exhaust gas treatment system for treating exhaust gas of an internal combustion engine of a vehicle, the exhaust gas treatment system comprising:
    a catalytic converter including:
        a housing defining an interior space and having an inlet and an outlet spaced from each other along a longitudinal axis and in fluid communication with the interior space;
        wherein the inlet and the outlet are radially offset relative to a radial center of the housing; and
        a monolith supported by the housing within the interior space of the housing and including a catalyst disposed thereon;
        wherein the monolith includes a plurality of regions radially spaced about the radial center of the housing and extending along the longitudinal axis, with each region of the monolith having a different cell density, and with each region of the monolith having a different catalyst disposed thereon;
        wherein at least one of the housing and the monolith includes a flow directing mechanism configured for re-directing at least a portion of the exhaust gas received through the inlet toward a pre-defined region of the monolith to more evenly distribute the exhaust gas across a cross sectional area of the monolith;
        wherein the flow directing mechanism includes a conical insert disposed within the housing, with the conical insert including a surface angled relative to the longitudinal axis and disposed adjacent the inlet of the housing; and
        wherein the conical insert is longitudinally spaced from the monolith along the longitudinal axis to define a space therebetween.

11. An exhaust gas treatment system as set forth in claim 10 wherein the cell density between adjacent regions decreases with an increase in the radial distance of each region from the radial center of the housing.

12. An exhaust gas treatment system as set forth in claim 10 wherein the flow directing mechanism includes an angled entrance surface defined by the monolith, with the angled entrance surface angled relative to the longitudinal axis and disposed adjacent the inlet of the housing.

13. An exhaust gas treatment system as set forth in claim 12 wherein the angled entrance surface of the monolith defines an outer radius relative to the longitudinal axis that continually changes along the longitudinal axis.

14. An exhaust gas treatment system as set forth in claim 10 wherein the surface of the conical insert forms an angle relative to the longitudinal axis between the range of 20° and 70°.

\* \* \* \* \*